US006313796B1

(12) United States Patent
Potin et al.

(10) Patent No.: US 6,313,796 B1
(45) Date of Patent: Nov. 6, 2001

(54) METHOD OF MAKING AN ANTENNA PANE, AND ANTENNA PANE

(75) Inventors: Marc Potin, Langres; Bernard Letemps, Thourottf, both of (FR)

(73) Assignee: Saint Gobain Vitrage International, Courbevoie (FR)

( * ) Notice: Subject to any disclaimer, the term of this patent is extended or adjusted under 35 U.S.C. 154(b) by 0 days.

(21) Appl. No.: 08/443,389

(22) Filed: May 17, 1995

Related U.S. Application Data

(63) Continuation of application No. 08/183,752, filed on Jan. 21, 1994, now abandoned.

(30) Foreign Application Priority Data

Jan. 21, 1993 (FR) .................................................. 93 00574

(51) Int. Cl.[7] .............................. H01Q 1/32; H01Q 1/38
(52) U.S. Cl. ................................. 343/700 MS; 343/713
(58) Field of Search ........................... 343/700 MS, 711, 343/713; H01Q 1/32, 1/38

(56) References Cited

U.S. PATENT DOCUMENTS

| | | | |
|---|---|---|---|
| 3,414,902 | * 12/1968 | Shaw, Jr. ................................ | 343/713 |
| 3,771,159 | * 11/1973 | Kawaguchi et al. ............... | 343/713 X |
| 3,910,809 | * 10/1975 | Fern et al. ........................ | 343/713 X |
| 4,506,148 | * 3/1985 | Berthold et al. ................... | 235/380 |
| 4,633,262 | 12/1986 | Traut ............................. | 343/700 MS |
| 5,068,521 | * 11/1991 | Yamaguchi ........................ | 235/492 |
| 5,105,171 | * 4/1992 | Wen et al. ........................ | 333/116 |
| 5,115,245 | * 5/1992 | Wen et al. ........................ | 342/175 |
| 5,157,247 | * 10/1992 | Takahira ........................... | 235/492 |
| 5,161,255 | 11/1992 | Tsuchiya ............................. | 455/345 |
| 5,198,824 | * 3/1993 | Poradish ......................... | 343/700 MS |
| 5,218,343 | * 6/1993 | Stobbe et al. ......................... | 340/572 |
| 5,235,736 | * 8/1993 | Hahs, Jr. et al. ......... | 343/700 MS X |
| 5,276,457 | * 1/1994 | Agarwal et al. .......... | 343/700 MS X |
| 5,410,749 | * 4/1995 | Siwiak et al. ............. | 343/700 MS X |

FOREIGN PATENT DOCUMENTS

| | | | |
|---|---|---|---|
| 0048305 | * 5/1983 | (DE) | ............... 343/700 MS |
| 3834075 | 4/1989 | (DE) | ............... H01Q/1/32 |
| 0 516 981 | 9/1992 | (EP) | ............... H10Q/1/24 |
| 1358483 | * 7/1974 | (GB) | ............... 343/713 |
| 3196705 | * 12/1989 | (JP) | ............... 343/700 MS |
| 4326203 | * 11/1992 | (JP) | ............... H01Q/1/32 |
| 8702218 | * 4/1989 | (NL) | ............... H01Q/1/38 |

OTHER PUBLICATIONS

McIlvenna, John F., "Monolithic Phased Arrays for EHF Communications Terminals", Microwave Journal, pp 113–125, Mar. 1988.*

Yoo et al., "Theoretical and Experimental Development of 10 and 35 GHz Rectennas", IEEE, vol. 40, No. 6, pp 1259–1266, Jun. 1992.*

Patent Abstr of Japan v. 17 no160 (E–1342) Mar. 29, 1993 & JP–A–4323905 (Asahi Glass) Nov. 13, 1992.

* cited by examiner

Primary Examiner—Michael C. Wimer

(57) ABSTRACT

This invention relates to panes, notably laminated panes, composed of at least one sheet of rigid material, and permanently containing a surface antenna composed of at least one microstrip separated from an earth plane by a dielectric. These panes, having such an antenna, are used for the reception and transmission of frequencies higher than 1 GHz and preferably for the frequency bands 5795–5815 MHz, 63–64 GHz and 74–77 GHz.

26 Claims, 2 Drawing Sheets

METHOD OF MAKING AN ANTENNA PANE, AND ANTENNA PANE

This application is a Continuation of application Ser. No. 08/183,752, filed on Jan. 21, 1994, now abandoned.

BACKGROUND OF THE INVENTION

1. Field of the Invention

This invention is related to a pane, in particular a laminated pane, for automobiles, for example, equipped with electrical conductors serving as an antenna inside the pane.

2. Description of the Related Art

It is known, notably from Patent Application EP-0 325 510, to embed metal wires in the intermediate film of plastic material in a laminated pane. These metal wires can serve as a radio antenna for frequencies which in general do not exceed 3 GHz. For the reception or transmission of signals having a higher frequency, and notably of ultra high frequency signals, these antenna made from metal wires are no longer effective. For these frequencies, it is known to use metal surfaces termed microstrips or "pellets". On the other hand, this microstrip is not always sufficient and should advantageously be associated with an earth (ground) plane which is a conducting film of larger area. These two films are then separated from each other by a dielectric.

To improve reception, it is also possible to associate several microstrips connected in accordance with the techniques known to the person skilled in the art.

At present this type of frequency and, more especially, the 5795–5815 MHz, 63–64 GHz and 74–77 GHz bands, are used notably for vehicle-route communications, in particular for recognition of the vehicles and authentication of payment when the vehicles pass a remote toll charging station. These devices in development consist of disposing a casing behind the windscreen, this casing containing the antenna and being connected to a device enabling information to be received and instructions to be transmitted, notably payment instructions. It comprises, for example, a signal processing unit such as a keyboard associated with a screen. This latter device may be integrated into the vehicle dashboard, while in contrast the casing containing the antenna remains visible because it must be held at an orientation, defined by the transmitter, which enables the signal to be received while passing in front of this transmitter.

Another disadvantage associated with this device may be bad reception of the signal, or indeed impossibility of reception in the case where the windscreen possesses a film based upon a metallic oxide such as a reflective film. The signal is then in effect at least partly attenuated.

SUMMARY OF THE INVENTION

The present invention alleviates the disadvantages listed by proposing a new transmission and reception system of an ultra high frequency signal.

The problems presented by the use of such an antenna are resolved by the present invention, in which an antenna pane, notably for automobiles, is comprised of at least one sheet of rigid material comprising a surface antenna composed of a microstrip separated from an earth (ground) plane by a dielectric.

In one form of embodiment of the pane, this pane is a laminated pane constituted of at least one glass sheet and at least one film of plastic material. It may be, for example, an asymmetric type pane such as that described in Patent Application EP-A-132 198. Preferably, the laminated pane is composed of at least two glass sheets separated by an intermediate layer, notably of polyvinyl butyral, and the antenna is advantageously integrated between the two glass sheets.

The integration of the surface antenna into the pane thus make it possible to have the device not within the passenger compartment of the vehicle.

This realization also allows the antenna to hug the form of the pane closely and thus to avoid possible risks of bad reception.

Furthermore, the antenna inserted into the pane is protected from any degradation due to external influences.

Moreover, its position is fixedly defined and cannot be modified. Thus, the position of the transmitter being known, for example that of a toll station, the characteristics and position of the antenna in the pane are defined and the antenna cannot again be perturbed.

Another advantage of the system according to this invention is that the presence of a reflective film on one of the faces of the glass sheet intended to be towards the passenger compartment of the vehicle, which led to a risk of attenuating the signal received by an antenna situated in the compartment, no longer presents any disadvantage provided that it is disposed between the antenna and the passenger compartment. In addition, it can contribute to protecting the passengers against radiation from the antenna.

Also, according to one preferred form of the invention, the film deposited on one of the faces of the inner glass sheet, that is the sheet nearest the passenger compartment, can be used as an earth plane for the surface antenna.

Moreover, depending upon which face it is that the reflective coating is deposited, the glass sheet may, if desired, fulfill the function of a dielectric.

In a first variant, the surface antenna is disposed between an intermediate film formed between two glass sheets and one of the glass sheets.

A second variant according to this invention consists of placing the microstrip in contact with the glass sheet which is towards the outside of the vehicle, placing the earth plane in contact with the glass sheet towards the inside of the vehicle, and of using the intermediate sheet as the dielectric.

Another disadvantage of the known antennas concerns the cable carrying the signal received. In fact, as soon as this cable exceeds a given length, it may itself form an antenna and the signal that it receives perturbs the signal which it carries. Moreover, if its length is not exactly controlled, the phase at the end of the cable is also not controlled. Finally, ultra high frequencies have very high loss rates and the corrections are difficult to carry out. A solution according to this invention consists of using a cable of the "flat coaxial" type.

According to one preferred solution of the invention, the antenna is associated with an electronic chip enabling the signal received to be demodulated and a conductor wire conducting the demodulated signal to the outside of the pane. This second signal has a much lower frequency, which resolves the aforementioned problems.

The incorporation of a chip into the pane for this application is all the more advantageous since it can also serve for processing the signal received, or indeed for other applications. It may, for example, serve for the construction of demisting sensors, for the construction of devices enabling a vehicle to be found and identified, for example after a theft, or for the construction of any type of sensor. The person skilled in the art will be able to define and construct a chip enabling the various functions chosen to be simultaneously obtained.

With regard to the incorporation of the electronic chip, it is preferably deposited on an integration support by the "flip-chip" technique. Moreover, the electronic chip has dimensions allowing it to be inserted into a laminated pane. Its surface area is advantageously between 1 and 2 mm$^2$ and its thickness less than 150 microns.

Moreover, in order to withstand the conditions linked with the manufacturing conditions for a laminated pane, the electronic chip advantageously is resistant to temperatures between −70° C. and 160° C. and to pressures of at least 3 bars and preferably at least 10 bars.

The antenna has a relatively large area, which it is preferable to conceal. To achieve this, the antenna optionally in association with a chip may be deposited in a zone of the pane possessing an enamel on the outer face of the glass sheet towards the vehicle interior. This may be, notably, in the case of a windscreen or lateral window of the vehicle, the peripheral enamel strip enabling, in particular, the bonding of the antenna to the vehicle to be concealed.

The invention is also directed to a process for the production of these panes and, more particularly, to laminated panes comprising two glass sheets, and one intermediate film and a surface antenna placed between the two glass sheets.

The incorporation of such an antenna within a pane is not as simple to carry out as the incorporation of metal wires. In fact, wires are not very bulky by reason of their small dimensions and generally merge into the heating networks. In contrast, surface antenna are, of course, larger.

On the other hand, as explained above, surface antenna are advantageously composed of at least three layers, which are the microstrip fulfilling the function of principal receiver, the dielectric and the earth plane.

In a first variant of the process according to the invention, the process for the production of a laminated pane, notably for automobile vehicles, comprising a surface antenna is carried out in one step. It consists, during the course of production of the pane, of placing between the two glass sheets a complete antenna, previously constructed and optionally associated with a chip. The antenna is deposited in such a way that the microstrip is oriented towards the outside of the vehicle.

In a second variant of the process according to the invention, the process consists of constructing the antenna simultaneously with the construction of the pane, and may then be performed in several steps.

According to this second variant of the process according to the invention, at least one of the layers forming the antenna may be deposited, notably by screen printing or in the form of foils, onto the faces of the glass sheets or onto the faces of the intermediate film. These layers are either deposited by superposition on a single face or deposited on different faces, always with the incorporation of a dielectric between the microstrip and the earth plane.

In all cases, the microstrip fulfilling the function of the principal receiver is oriented towards the outside of the vehicle, with respect to the earth plane.

BRIEF DESCRIPTION OF THE DRAWINGS

Other details and advantageous characteristics of the invention will now become apparent from the examples of embodiment described with reference to FIGS. 1, 2, 3 and 4, wherein.

DESCRIPTION OF THE PREFERRED EMBODIMENTS

Figure 1A:
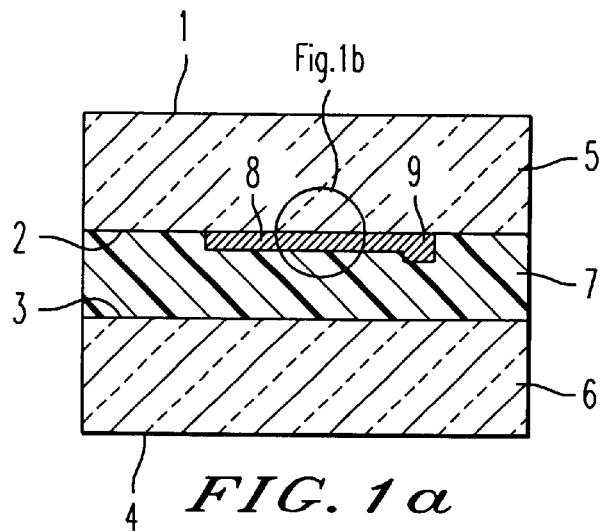
FIG. 1a is a side elevation of a basic laminated pane comprising two glass sheets, an intermediate layer and a surface antenna between the intermediate layer and the glass sheet towards the outside of the vehicle.
Figure 1B:
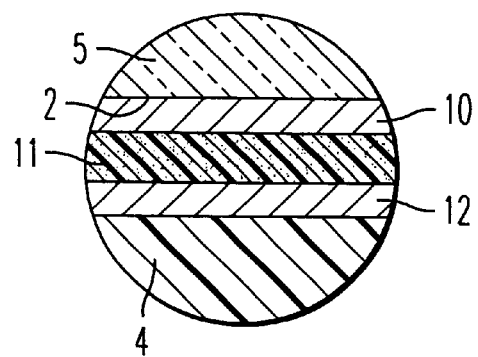
FIG. 1b is a detailed view of a surface antenna.

In FIG. 1a there is shown a side elevation of a laminated pane, composed of a glass sheet 5 intended to be towards the outside of the vehicle, a glass sheet 6 intended to be towards the passenger compartment and an intermediate layer 7. The faces of the two glass sheets of such a laminated pane are conventionally numbered from 1 to 4 from the outer face to the inner face towards the passenger compartment. The intermediate layer 7 is generally of plasticized polyvinyl butyral or polyurethane. A surface antenna 8 is disposed between the outwardly facing glass sheet 5 and the intermediate layer 7. The surface antenna 8 is composed of three superimposed films, the detail of which is shown in FIG. 1b. In contact with the glass sheet 5 there is deposited a microstrip 10, constituting the principal reception or transmission element, and the dimensions of which are of the order of magnitude of the wavelength of the signal received. The dielectric 11, deposited between this microstrip 10 and the earth plane 12, is for example an epoxy resin reinforced with glass fibers or any other material known to the person skilled in the art, such as polytetrafluoroethylene or cyanate ester. The earth plane 12, covering the dielectric, should have an area greater than that of the microstrip 10. It is possible to associate with the surface antenna 8 arranged in this manner a chip 9, which enables the signal to be demodulated and, if desired, processed before it is carried, for example, by a cable to the outside of the pane.

Such a chip typically has dimensions of 1 mm×1 mm and a thickness of approximately 0.3 mm, and preferably less than 150 microns. It is therefore not very large and can be embedded in the polyvinyl butyral without being a nuisance from the point of view of thickness.

The pane shown in FIG. 1a may be produced in various ways. A first technique consists of previously constructing the surface antenna 8. It is then present in the form of a single element; the various layers are, for example, supported by an epoxy resin reinforced with glass fibers. It is also possible to associate the chip 9 allowing demodulation during this preliminary step. The antenna 8 is then deposited during the construction of the pane between the glass sheet 5 and intermediate layer 7. In order to facilitate installation, it is possible to arrange for gluing of the antenna 8.

Another technique consists of depositing the microstrip 10 of the antenna, for example by screen printing or in the form of foils, on the face 2 of the glass sheet 5, of placing the dielectric 11 in such a way as to thoroughly insulate the first layer 10, and of then depositing over this, for example by similar methods, the earth plane. This technique may require double baking.

One variant of this technique consists of depositing the earth plane 12, for example in the form of foil strips, on the intermediate layer 7 of polyvinyl butyral.

Figure 2:
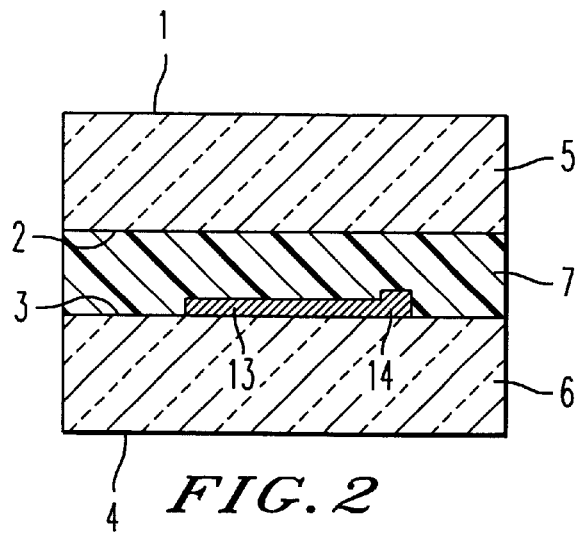
FIG. 2 is a basic side view in elevation of a laminated pane comprising two glass sheets towards the passenger compartment and the intermediate layer.

FIG. 2 shows a side elevation of another example of embodiment of a laminated pane comprising a surface antenna 13. As in FIG. 1a, the pane is composed of a glass sheet 5 intended to be oriented towards the outside, of a glass sheet 6 intended to be oriented towards the passenger compartment, and of an intermediate layer 7 for example of polyvinyl butyral. In this representation, the surface antenna 13 is placed between the intermediate film 7 and the glass sheet 6. It is also possible to associate a chip 14 with the surface antenna 13, which is embedded in the thickness of the intermediate film 7. The techniques enabling this configuration to be obtained are almost of the same as those leading to FIG. 1a. It should, however, be noted that for a signal to be received, the microstrip should be in contact with the signal before the earth plane, which reflects the earth plane, more precisely in contact with the face 3 of the glass sheet 6, in contrast to the case of FIG. 1a, where it is the microstrip that is in contact with face 2 of the glass sheet 5.

It is thus possible to obtain this configuration either by placing a previously constructed surface antenna 13, or by depositing, on face 3 of the glass sheet 6, the earth plane, for example by screen printing or in the form of foil strips, then the microstrip with the insertion of a dielectric therebetween, or by depositing the earth plane on face 3 of the glass sheet 6, for example by screen printing or in the form of foil strips, and depositing the microstrip on the intermediate film 7, for example in the form of foil strips.

In the case of FIG. 2, there exists a supplementary variant if the glass sheet carries a film of the reflective type. This type of film is, for example, deposited directly on the glass as it leaves the float bath, for example by pyrolysis. This film may be used as earth plane, the construction of the antenna thus being simplified. Furthermore, if this film is deposited on face 4 of the glass sheet 6, the glass sheet 6 may be used as dielectric. It only then remains to deposit the microstrip, for example by screen printing or in the form of foil strips, either on the glass sheet 6 on face 3 or on the intermediate film 7.

It is also possible to deposit, for example by screen printing, an earth plane on face 4 of the glass sheet 6 when the latter does not carry a film of the reflective type. The glass sheet 6 can then also be used as dielectric.

In all cases and as in the case of FIG. 1, the antenna may be associated with a chip 14.

Figure 3:
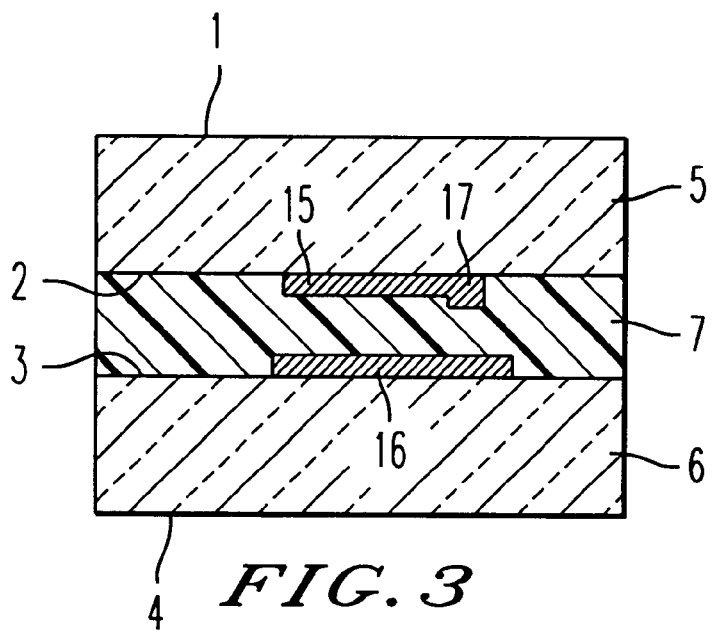
FIG. 3 is a basic side view in elevation of a laminated pane comprising two glass sheets, an intermediate layer and a surface antenna between the two glass sheets, disposed on either side of the intermediate layer.

A third type of arrangement is shown in FIG. 3. The laminated pane here is again composed of two glass sheets 5 and 6 and of an intermediate film 7 of polyvinyl butyral. In this arrangement the intermediate film 7 also fulfills the function of dielectric for the surface antenna. The microstrip 15 is now placed between the glass sheet 5, intended to face towards the outside of the vehicle, and the intermediate layer 7. It may be deposited, for example, by screen printing or in the form of foil strips, either on face 2 of the glass sheet 5 or on the intermediate film 7. The earth plane 16 is deposited, for example by screen printing or in the form of foil strips, either on the intermediate film 7 or on face 3 of the glass sheet 6. It may also, as in the case of FIG. 2, be composed of a film of the reflective type, deposited for example directly on the glass as it leaves the float bath by pyrolysis.

In the case in which the microstrip 15 and the earth plane 16 are each deposited on faces of the intermediate film 7, it is possible to carry out a deposition for example in the form of foil strips on both faces. In fact, this demands careful handling. In order to avoid this requirement, it is possible to carry out the depositions on two sheets, preferably of polyvinyl butyral, which are subsequently associated together to form the intermediate film 7, of the desired thickness, and in such a way as to obtain the configuration of FIG. 3. In each case, the antenna can, of course, be associated with a chip 17.

It is possible in the case of each of the figures to deposit an enameled film, generally on face 4 of glass sheet 6, which enables the antenna to be concealed, notably from view by the occupants of the vehicle.

Figure 4:
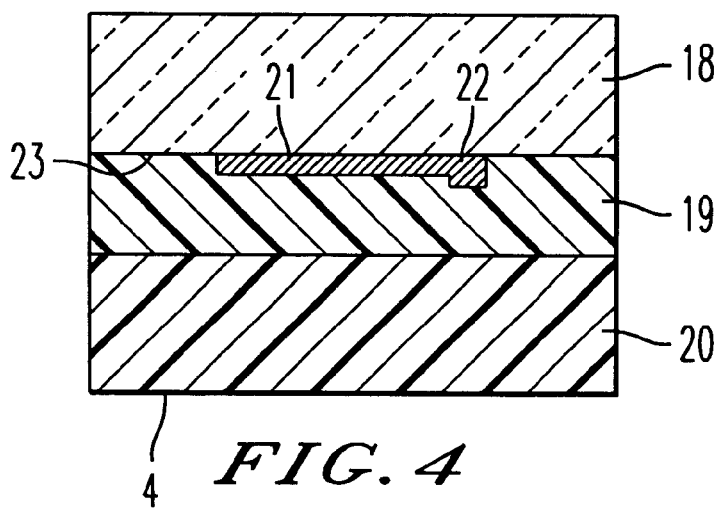
FIG. 4 is a basic side view in elevation of a laminated pane comprising one glass sheet, two plastic layers and a surface antenna between the glass sheet and the films of plastic material.

FIG. 4 shows a side elevation of a basic layout for a laminated pane comprising a single glass sheet 18 and two films of plastic material 19 and 20, for example an inner film of polyvinyl butyral and a film of polyurethane, or two films of polyurethane. In this arrangement, the surface antenna 21 is placed in association with an electronic chip 22 between the glass sheet 18 and the film 19.

The various techniques leading to this configuration are analogous to those of FIG. 1a, that is to say the antenna may be manufactured in advance or it can be manufactured simultaneously with the production of the pane, either by deposition, for example by screen printing, or in the form of foil strips on the face 23 of the glass sheet 18, of the microstrip and then of the earth plane with the insertion between them of a dielectric, or by deposition of the earth plane, for example in the form of foil strips, on the film 19 of plastics material.

The analogy given here with FIG. 1a may also be made with FIGS. 2 and 3 for configurations not illustrated here. It is then sufficient to associate the glass sheet 18 with the glass sheet 5, the film of plastics material 19 with the intermediate film 7, and the film of plastics material 20 with the glass sheet 6.

With regard to the production of the laminated panes comprising this antenna, this may be done by any conventional means known to the person skilled in the art. This person will determine at what instant of manufacture the antenna is installed, notably in the cases that comprise deposition phases.

On the other hand, the incorporation of a chip does not present any problem, either from the aspect of thickness since they can be sufficiently thin to be embedded in the polyvinyl butyral, nor from the aspect of resistance, since they can withstand the conditions, in particular of temperature, that are typical in the production of laminated panes.

The panes thus described may be used, notably, as windscreens or as lateral window panes on any type of automobile vehicle. Such antennas, for example designed to transmit and receive frequencies of 5.8 GHz, may be used for remote toll payment or, for example, for the reception of highway news transmissions.

The pane thus produced can be supplied and the client then has the choice of using it or not. All he then needs to do is to connect, to a connection provided for this purpose, a device which then becomes connected to the antenna.

Tests have been carried out for the purpose of measuring the attenuation of the signal received by an antenna of the surface antenna type incorporated in a pane, and are provided in Table 1 below.

For performing these tests, a glass sheet is interposed between a transmitter horn and the antenna. The glass sheets tested were chosen from among those glass sheets that may be used in automobiles.

An attenuation less than 6 dB allows good functioning of the antenna. An attenuation greater than 20 dB indicates that it is possible to use the film deposited on the glass as earth plane for the antenna.

TABLE 1

|                              | Thickness (mm) | Attenuation (dB) |
|------------------------------|----------------|------------------|
| clear glass                  | 2.2            | 2                |
| clear glass                  | 4              | 4.8              |
| colored glass                | 3.15           | 5.6              |
| glass with a silver enamel film | 4           | 30               |
| glass with two silver films  | 4              | 34               |

These tests confirm the good performance of a surface antenna incorporated in a suitable pane. Furthermore, the above results confirm that certain films, such as a silver enamel, perturb the use of a surface antenna placed inside the passenger compartment of the vehicle. On the other hand, it also appears that some of these films (attenuation>30 dB) can be used as earth plane.

Obviously, numerous modifications and variations of the present invention are possible in the light of the above teachings. It is therefore to be understood that within the scope of the appended claims, the invention may be practiced otherwise than as specifically described herein.

What is claimed is:

1. An antenna pane for a vehicle, comprising:
    at least one sheet of rigid material; and
    a surface antenna comprising at least one microstrip separated from an earth plane by a dielectric fixedly mounted on said at least one sheet;
    an electronic chip connected to said antenna for demodulating a signal received by said antenna;
    wherein said sheet comprises at least two glass sheets; and
    said antenna is integrated between said at least two glass sheets.

2. A pane according to claim 1, wherein said sheet comprises at least one glass sheet and at least one film of plastic material.

3. A pane according to claim 2, wherein said sheet comprises at least two glass sheets separated by an intermediate film of polyvinyl butyral.

4. A pane according to claim 3, wherein said antenna is disposed between said intermediate layer and one of said glass sheets.

5. A pane according to claim 3, comprising:
    a first glass sheet of said at least two glass sheets facing towards a passenger compartment of said vehicle; and
    a reflective film formed on said first glass sheet and used as said earth plane.

6. A pane according to claim 3, wherein said intermediate film is used as said dielectric.

7. Using an antenna comprising a surface antenna, as described in claim 3, for the reception and transmission of frequencies greater than 1 GHz.

8. A pane according to claim 2, comprising:
    an electronic chip connected to said surface antenna;
    one surface of one of said at least one glass sheet and at least one plastic film having a wave reflecting coating;
    at least one of said chip and said surface antenna being disposed in a position outside said reflective coating, when said pane is mounted on said vehicle.

9. Using an antenna comprising a surface antenna, as described in claim 3, for the reception and transmission of frequencies in the range of 5795–5815 MHz.

10. Using an antenna comprising a surface antenna, as described in claim 3, for the reception and transmission of frequencies in the range of 63–64 GHz.

11. Using an antenna comprising a surface antenna, as described in claim 3, for the reception and transmission of frequencies in the range of 74–77 GHz.

12. A pane according to claim 1, further comprising a cable for receiving a demodulated signal outputted by said electronic chip.

13. A pane for a vehicle, comprising:
    at least two glass sheets separated by an intermediate layer;
    an electronic chip disposed between said at least two glass sheets for at least one of demodulating and processing an ultra high frequency signal.

14. A pane according to claim 13, wherein said electronic chip has an area between 1 and 2 $mm^2$ and a thickness less than 150 $\mu$.

15. A pane according to claim 13, wherein said electronic chip can withstand temperatures between −70° C. and 160° C.

16. A pane according to claim 13, wherein said electronic chip can withstand pressures of at least 3 bars.

17. A pane according to claim 13, wherein said electronic chip performs at least one of the following:
    demodulation of a signal, processing of a signal, mist detection, identification of a vehicle, and detection of variations in predetermined parameters.

18. A pane according to claim 13, wherein said electronic chip is fixed to an integration support by a flip-chip technique.

19. A pane according to claim 13, further comprising a cable for receiving a demodulated signal outputted by said electronic chip.

20. A process for producing a laminated pane for a vehicle, comprising, during said pane, depositing a previously manufactured surface antenna associated with an electronic chip for demodulating a signal received by said antenna on said pane.

21. A process according to claim 20, further comprising depositing a cable for receiving a demodulated signal outputted by said electronic chip.

22. A process for producing a laminated pane for a vehicle, comprising:
    forming at least one glass sheet; and
    mounting a surface antenna associated with an electronic chip for demodulating a signal received by said antenna within said pane simultaneously with producing said pane.

23. A process according to claim 22, comprising depositing at least one constituent film of said antenna on one face of one said at least one glass sheet.

24. A process according to claim 22, comprising:
    forming two glass sheets; and
    interposing a dielectric between said two glass sheets.

25. A process according to claim 22, comprising:
    forming said pane by disposing an intermediate layer of polyvinyl butyral between at least two glass sheets; and
    depositing at least one film forming said antenna on a face of the intermediate layer.

26. A process according to claim 22, further comprising mounting within said pane a cable for receiving a demodulated signal outputted by said electronic chip.

* * * * *